Dec. 26, 1939.    B. L. CONLEY    2,184,412
ELECTRIC MOTOR SWITCH
Filed Oct. 30, 1935    2 Sheets-Sheet 1

INVENTOR
Brooks L. Conley
BY Harry S. Demarse
ATTORNEY

Dec. 26, 1939.  B. L. CONLEY  2,184,412
ELECTRIC MOTOR SWITCH
Filed Oct. 30, 1935  2 Sheets-Sheet 2

INVENTOR
Brooks L. Conley
BY
Harry S. Dumarse
ATTORNEY

Patented Dec. 26, 1939

2,184,412

UNITED STATES PATENT OFFICE 2,184,412

ELECTRIC MOTOR SWITCH

Brooks L. Conley, Jersey City, N. J., assignor of one-half to Frederick S. Kingston, Jersey City, N. J.

Application October 30, 1935, Serial No. 47,375

11 Claims. (Cl. 200—80)

The present invention relates to electric motors in general and more particularly to centrifugal switches for electric motors. More specifically the invention comprises a centrifugally operated switch, part of which is mounted upon the rotating part of the motor and part upon the stationary part thereof, which operates with a snap action upon the motor attaining a critical speed of rotation, and which holds and retains its new position until the motor speed has decreased to a point below the original speed of operation in the acceleration of the motor.

It is an object of the present invention to provide a new and improved centrifugal switch for electric motors or generators. It is another object of the invention to provide an electric motor centrifugal switch in which there is a delayed action to permit the centrifugally operated parts of the switch to accelerate before actuating the current-controlling parts. Another object of the invention is to provide a centrifugal switch for electric motors in which the motor speed at which the switch operates in the acceleration of the motor is greater than the speed at which the switch operates in the deceleration of the motor. A still further object of the invention is to provide a new and novel centrifugal switch for electric motors in which all fluttering action in the current-carrying contacts is eliminated. Still another object is the provision of a centrifugally operated switch for electric motors in which the part of the switch mounted upon the stationary part of the motor is provided with mechanism providing a delayed action in the movement of the current-carrying contacts. These and other more specific objects will become apparent upon reading the following specification and claims and upon considering in connection therewith the attached drawings to which they relate.

Referring now to the drawings, in which the same reference characters refer to the same parts throughout:

Figure 8:
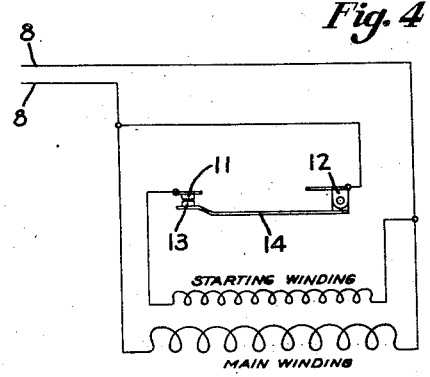
Figure 8 is a diagrammatic showing of the motor circuit which a switch constructed in accordance with the present invention is adapted to control.

Referring to the drawings, an electric motor constructed in accordance with the present invention is illustrated. The motor comprises a stator, which includes a frame or casing 1 and a field 2, and a rotor 3. The end walls or plates 4 of the stator are formed with bearing housings 5, 5 within each of which is positioned a bearing 6. The rotor 3 includes a through supporting shaft 7 which is rotatably mounted in the bearings 6, 6. Current-carrying leads 8, 8 enter the casing 1 and are connected to the stator, the exact electrical circuit of the motor being unimportant. In Figure 8 of the drawings a typical circuit is illustrated in which the leads 8, 8 are connected to the main winding of the stator and to a starting winding, the two windings being in parallel, a switch being provided in series with the starting winding. It is in the specific construction of the switch that the present invention lies.

A centrifugal switch constructed in accordance with the present invention can be divided into two main parts. The first part may be called the non-rotating, stationary, frame-mounted part; the second part may be called the rotating or rotor-carried part. The contacts which are connected in the circuit of the electric current, and which are adapted to open and close at least part of that circuit, are carried by the frame-carried part of switch. The actuating mechanism of the switch is mounted upon the rotating part or rotor of the motor.

Figure 1:
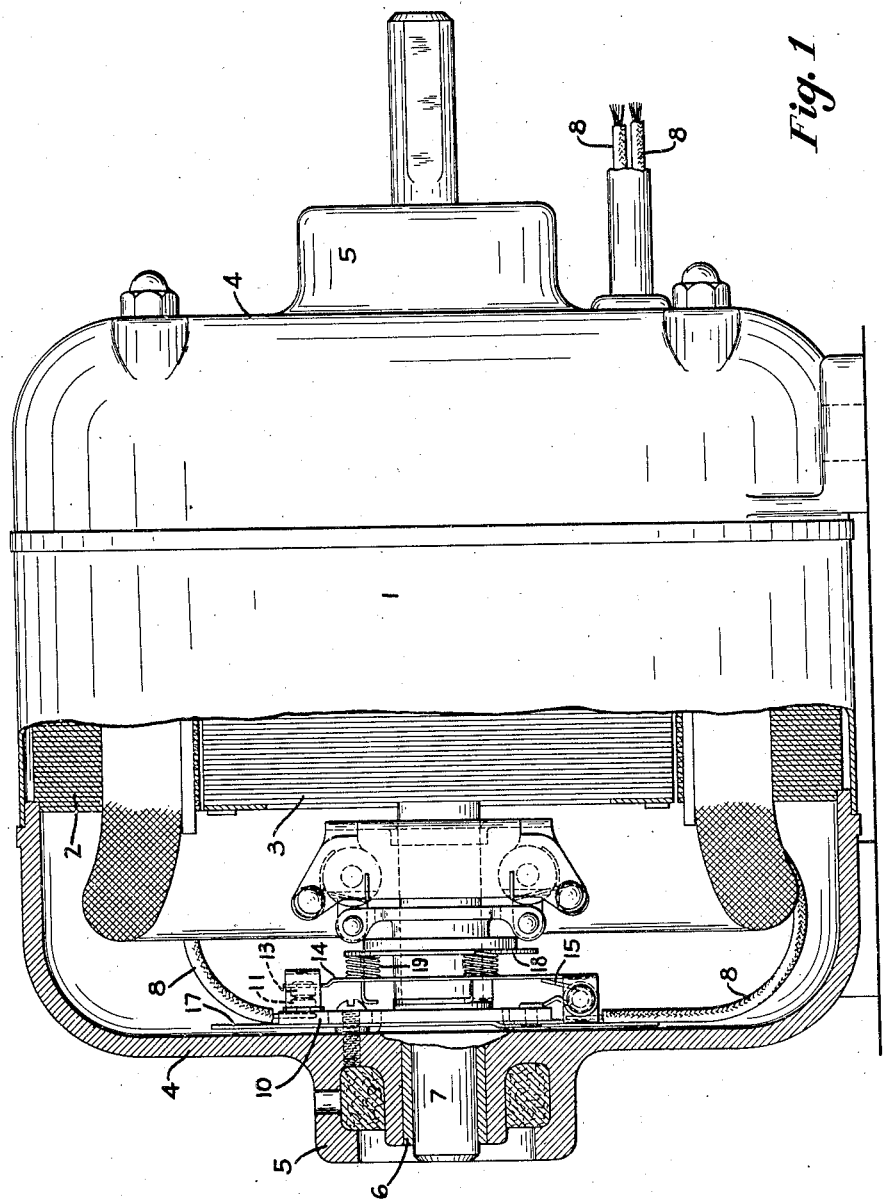
Figure 1 is a side elevation of an electric motor embodying a centrifugal switch constructed in accordance with the present invention, certain parts being broken away to illustrate the switch.
Figure 2:
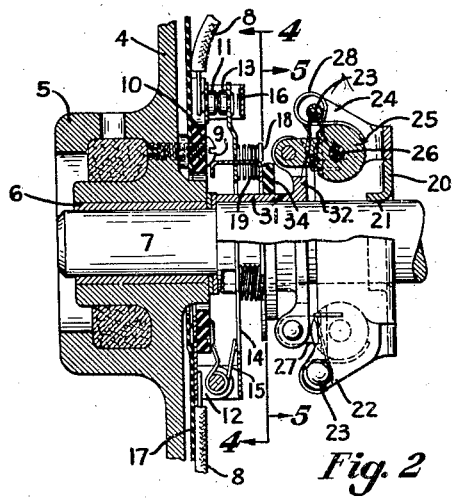
Figure 2 is a longitudinal section through the centrifugal switch illustrating its position with the motor standing.
Figure 3:
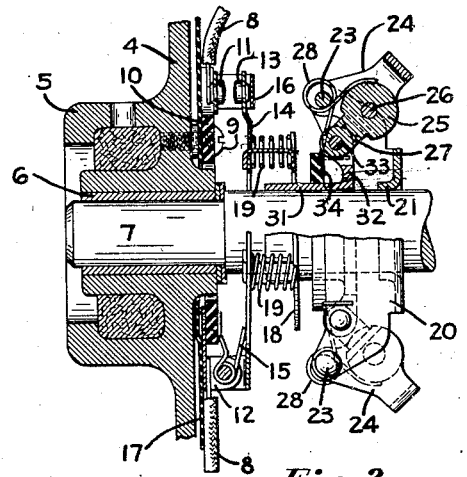
Figure 3 is a view similar to Figure 2 but with the switch parts shown in their motor-running positions.
Figure 4:
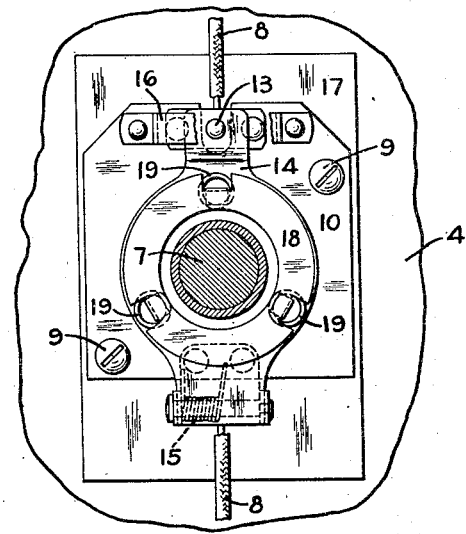
Figure 4 is a section upon the line 4—4 of Figure 2 showing the parts of the switch carried by the motor stator, and specifically by the end wall of the motor casing.
Figure 5:
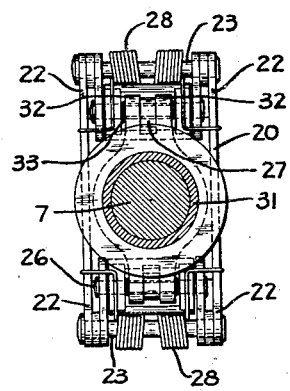
Figure 5 is a section looking in the direction of the arrows upon the line 5—5 of Figure 2 and shows the centrifugal weights and their connected parts.
Figure 6:
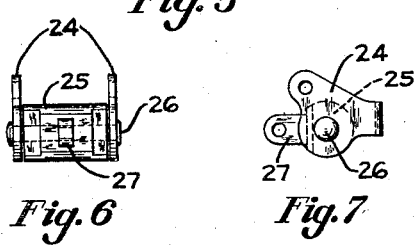
Figure 6 is a view of the centrifugal weight per se and its carrying cradle.
Figure 7:
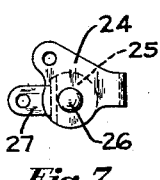
Figure 7 is a view at right angles to Figure 6.

In the switch constructed in accordance with the present invention the stationary part of the switch comprises a supporting plate 10 of insulating material which is secured to the inner face of the end wall 4 of the motor casing by screws 9, 9 there being a sheet of insulating paper 17 positioned between the plate and the end wall which extends at the sides of the plate. Supporting plate 10 is centrally apertured so that it extends around the motor shaft 7 and its supporting bearing 6, as is clearly illustrated at Figure 4. At one side of the motor shaft 7 a stationary contact 11 is carried by plate 10, a current-carrying lead 8 being connected thereto. At a point spaced from contact 11, preferably diametrically across shaft 7 therefrom, is a bracket 12 to which a second current-carrying lead 8 connects and which also forms a pivotal mounting for the supporting arm 14 of moving contact 13. Arm 14 is spaced from supporting plate 10 and extends parallel thereto, encircling the shaft 7 in the same manner as plate 10. There is provided a coil spring 15 at the pivot point of contact arm 14 which urges the contact from stationary contact 11. To fix the open position of contact 13 a stop 16 is provided which extends around both contacts and limits the pivotal movement of arm 14. Movable contact 13 is adapted to contact stationary contact 11 in a closed position, as illustrated in Figure 2, or to pivot therefrom to an open position, as illustrated in Figure 3.

A ring 18 is carried by contact-carrying arm 14 centrally and encloses rotor shaft 7, being movable toward and from arm 14 through being provided with arms which are slidable in arm 14 and which have overturned ends upon the opposite side of arm 14 to prevent separation. Coil springs 19 seat upon each of the arms of ring 18 and urge the ring from the supporting arm 14 to an outer limiting position in which the overturned ends of the ring arms contact the side of arm 14.

The rotating part of the switch mechanism, comprising that part mounted upon the rotor which functions to actuate the movable contact 13, comprises a frame 20 having a central seat portion 21 which seats with a press fit upon rotor shaft 7. Frame 20 is formed with diametrically spaced pairs of arms 22, 22, the arms of each pair being connected at their outer ends by a pin 23. A U-shaped cradle 24 pivots upon each pin 23 with its side arms positioned immediately inside of the side arms 22, 22 of frame 20. The central portion of each cradle 24 rests in its inner radial position upon the central portion of frame 20, as illustrated in Figure 2, but is adapted to pivot radially outward about pin 23 to an outer position illustrated in Figure 3.

A centrifugal weight 25 is mounted upon each cradle 24 radially within the pivot point of the cradle, as represented by its pivot pin 23, and axially spaced therefrom along the shaft 7, at a slight distance when the weight and cradle are in their inner radial positions. Each weight 25 is rotatably mounted upon its cradle by a pin 26 and is formed with an arm 27 which extends radially from the pin, the pin representing the center of mass of the weight as well as its pivot point upon the cradle. There is a coil spring 28 encircling and seating upon the pivot pin 23 of each cradle 24. The outer extended end of each spring is turned at right angles to the frame 20 to lie thereagainst in order that a central projecting portion which overlies the outer surface of one weight 25 may exert a force urging the weight radially inward. It is clear that the outward radial movement of each weight 25, together with its carrying cradle 24, takes place against the opposition of the coil spring 28 acting against the weight.

A sleeve 31 is slidable upon the shaft 7 between the frame 20 and the adjacent end of the motor casing. This sleeve is formed with radially extending, diametrically opposed, pairs of arms 32, 32 at its inner end. Each pair of arms 32, 32 encloses an arm 27 of a weight 25 and a pivot pin 33 extends therethrough so that upon the pivotal movement of a weight 25 about the cradle-supporting pin 23 as an axis the sleeve 31 will be drawn axially from the adjacent end wall of the motor casing and toward the frame 20. Enclosing and seating upon sleeve 31 in a pressed fit relationship is a collar 34 of insulating material which is adapted to contact rings 18 carried by arm 14 as the sleeve 31 moves along shaft 7 in the direction of the motor end wall.

The position of the switch parts with the motor standing or inoperative is as illustrated in Figure 2. Under the force exerted by the weight-actuating springs 28, 28 each weight 25 is pivoted to its inner radial position with its cradle 24 resting upon the limiting shoulders of the switch frame 20. Sleeve 31 is positioned with its outer end extended through the shaft-enclosing openings in contact-carrying arm 14 and in the ring 18. Insulating collar 34 carried by the sleeve has contacted ring 18 compressing coil springs 19, 19, 19 holding the arm 14 with movable contact 13 in contact with stationary contact 11. Collar 34 is so positioned upon sleeve 31 that springs 19, 19, 19 are compressed so that they exert a force upon pivot arm 14 which is greater than the opposing force exerted by coil spring 15 at the pivot point of the arm.

Upon the starting of the motor current passes through the leads 8, 8 and thru the closed contacts 11 and 13 as illustrated in Figure 2. As the motor accelerates a critical speed is reached at which the centrifugal force exerted by each weight 25, the two weights being identical and cooperating, acting through an initial lever arm represented by the axial distance between the center of pivot pin 23 of cradle 24 and the center of pin 26 of each weight, creates a moment sufficiently great to overcome the force exerted by the coil spring 28 acting thereon and the weight begins to move outwardly with its supporting cradle. Once the outward movement of the weights has begun the axial distance separating the centers of pivotal axis 23 and pin 26 grows greater, and without any further acceleration in motor speed the moment increases so that once begun the outward movement of the weights continues until they and their supporting cradles have reached their outermost positions. As the weights are connected to the sleeve 31 their outward radial movement has functioned to draw the sleeve axially inward and from the position illustrated in Figure 2 to that shown in Figure 3.

The initial movement of the sleeve 31 under the actuation of weights 25, 25 has resulted in no change in the relative positions of the contacts 11 and 13. The movement of sleeve 31 with its insulating collar 34 results at first only in the expansion of coil springs 19, 19, 19. The continued movement of collar 34, however, results in the force exerted by the coil springs decreasing to such a point that the force exerted by spring 15 in opposition thereto exceeds their combined forces and contact-carrying arm 14 is pivoted outwardly and contact 13 moves from contact 7 opening the circuit through the starting winding of the motor. At the time the movement of the arm 14 takes place, the sleeve 31 is moving at maximum speed and the pivoting moment of the weights 25, 25 has so increased that reversal in their direction of travel is impossible unless the motor speed decreases substantially.

The break of the contacts is therefore definite and without fluttering.

With the centrifugal weights moved to their outer radial positions as illustrated in Figure 3, in the operation of the motor, the motor speed can be decreased substantially below the point at which the switch originally opened without the switch again operating. This is true because the lever arm of each weight 25 about its pivot point 23, and accordingly the movement opposing the springs 28, 28, is greater than it was with the switch in the starting position. Reference to the axial distances between the center lines of pins 23 and 26 in Figures 2 and 3, respectively, illustrates this fact.

The embodiment which is here described and illustrated is a preferred form of the invention but the scope of the invention is not limited except as specified in the following claims.

I claim:

1. In a motor having a stator including a casing with an end wall and a rotor including a rotatable shaft, a stationary contact mounted on said end wall, a movable contact mounted on said end wall, extending around said shaft, and movable to and from said stationary contact, spring means acting on said movable contact and urging it in one direction, a member movably mounted on said movable contact, extending around said shaft, and movable toward and from said movable contact, and second spring means acting on said member and urging it relative to said movable contact, the relationship being such that a force acting on said member against its spring force also acts against the force of the spring acting on said movable contact, and means to move said member relative to said movable contact and thereafter said movable contact relative to said stationary contact, said means comprising a centrifugal weight mounted on said shaft and movable relative thereto, and means to transmit force from said weight to said member.

2. In a motor having a stator including a casing with an end wall and a rotor including a rotatable shaft, a stationary contact on said end wall at one side of said shaft, a movable contact pivoted upon said end wall upon the opposite side of said shaft and extending around said shaft to said stationary contact, spring means urging said movable contact to open position, a ring carried by said movable contact extending around said shaft and movable toward and from said movable contact, spring means urging said ring from said movable contact, a collar slidably mounted on said shaft and shaped to contact said member to move it toward said movable contact and thereafter said movable contact toward said stationary contact against the forces exerted by said spring means, and means to move said collar axially upon said shaft including a centrifugal weight pivotally mounted on said shaft.

3. In a centrifugal switch for electric motors, the combination of a circuit controlling switch mounted on the frame of the motor and including a movable switch member extending transversely adjacent the motor shaft, resilient means normally holding said member in one position, an abutment member carried by said movable switch member, a tension member between said switch and said abutment member and adapted to oppose the force exerted upon said abutment member in a direction to move said switch member, an operating member mounted on the motor shaft shiftable axially thereof to open and close said switch member by the pressure exerted upon the abutment member, centrifugally actuated means for shifting said operating member, the relative strengths of the resilient means and the tension member being such that said abutment member is movable relative to said switch member by said operating member after being contacted thereby to prevent the transmission of fluttering to said switch member.

4. A centrifugal switch for electric motors, the combination of a switch member mounted on the frame of a motor and including a movable switch member and resilient means acting to hold said switch member normally in circuit open position, an abutment member carried by said movable switch member and positioned adjacent the motor shaft, a compression spring intermediate said abutment member and said movable switch member and means mounted on said shaft for operating said switch comprising a centrifugally actuated weight, a member slidable axially of said shaft and operatively connected with said weight, said centrifugal actuated member being adapted to shift said abutment member against the force of said spring and said resilient means to close said switch, said spring functioning to delay the transference of member movement to said switch.

5. A motor having a stationary part or stator and a rotating part or rotor, a switch mounted on said stator and including a movable switch member, means resiliently holding said member in one position, an abutment member carried by said movable switch member, spring means intermediate said abutment and switch members, the relation therebetween being such that a force exerted upon said abutment member in opposition to said spring means tends to compress said spring means and to move said movable switch member into a second position, and switch actuating means comprising a pivoted centrifugal weight mounted on said rotor and an axially shiftable centrifugally actuated member mounted on said rotor and adapted to have contact with said abutment member, said spring means being stronger than said resilient means when compressed with said switch member in the second position.

6. A motor having a casing and a rotative shaft mounted therein, the combination of a circuit controlling switch mounted at one end of said casing adjacent said shaft and including a movable switch member pivoted at one end and having a portion embracing said shaft, a spring acting on said movable switch member at its pivotal point to yieldingly hold the same in circuit open position, a flat abutment member surrounding said shaft and carried by said movable switch member, coiled spring elements intermediate said switch member and abutment member, a collar slidably mounted on said shaft adapted to be moved into and out of contact with said abutment member and in a direction to compress said springs and move said switch member into circuit closing position, and weighted lever arms pivotally mounted on said shaft and operatively connected with said collar for shifting the same after the motor has reached a predetermined speed.

7. In a centrifugal switch, a switch including a movable member, resilient means urging said member to one position, an abutment mounted on said member, spring means of greater strength than said resilient means urging said abutment from said member, and centrifugally operated means to move said abutment thereby compressing said spring means and moving said movable switch member to a second position against the force exerted by said resilient means, said spring means being sufficiently stronger than said resilient means so that said abutment will move a predetermined distance from said movable switch member upon the reverse movement of said centrifugally operated means before said member is actuated by said resilient means.

8. In a centrifugal switch, a stator, a switch including a movable member on said stator, resilient means urging said member in one direction, a rotor, centrifugally operated means on said rotor to move said member against the force of said resilient means, and second resilient means of greater strength than the first-mentioned resilient means on said stator and between said member and said centrifugally operated means to be compressed after said member has been moved against the force of said resilient means and to be expanded before said member can be moved by that force.

9. In a centrifugal switch a movable member, resilient means urging said member in one direction, an abutment on said resilient member, second resilient means urging said abutment from said movable member, a rotatable shaft, a slidable member on said shaft, centrifugally operable means to move said slidable member with an initial minimum force at a predetermined speed and with an increased force after initial movement thereby causing said slidable member to move with increasing speed, and third resilient means to force said slidable member against said abutment to compress said first and second resilient means with said shaft stationary and to prevent movement of said centrifugal means below a predetermined speed of rotation, whereby upon movement of said slidable member by said centrifugally operable means said second resilient means is decompressed.

10. In a centrifugal switch, a movable contact, an abutment carried by said contact and spring-held therefrom, a rotatable shaft, a frame carried by and rotatable with said shaft, a cradle pivoted upon said frame and abutting therewith in its inner radial position, a centrifugal weight carried by said cradle, and spring means opposing movement of said weight and cradle under the action of centrifugal force, a sleeve slidable on said shaft, means pivotally connecting said weight to said sleeve to move the latter axially upon radial movement of the former, and a contact-actuating-element carried by said sleeve and adapted to contact said abutment to compress said spring and to move said contact upon axial movement of said sleeve.

11. In a switch construction, a stationary contact, a movable contact, spring means urging said movable contact from said stationary contact, an abutment carried by said movable contact, second spring means spacing said abutment from said movable contact, said springs being arranged in series, and said abutment being adapted to receive a force to compress said springs to move said movable contact against said stationary contact, said second spring means being the stronger with said contacts abutting so that as the force is released said abutment initially moves from said movable contact.

BROOKS L. CONLEY.